UNITED STATES PATENT OFFICE 2,527,493

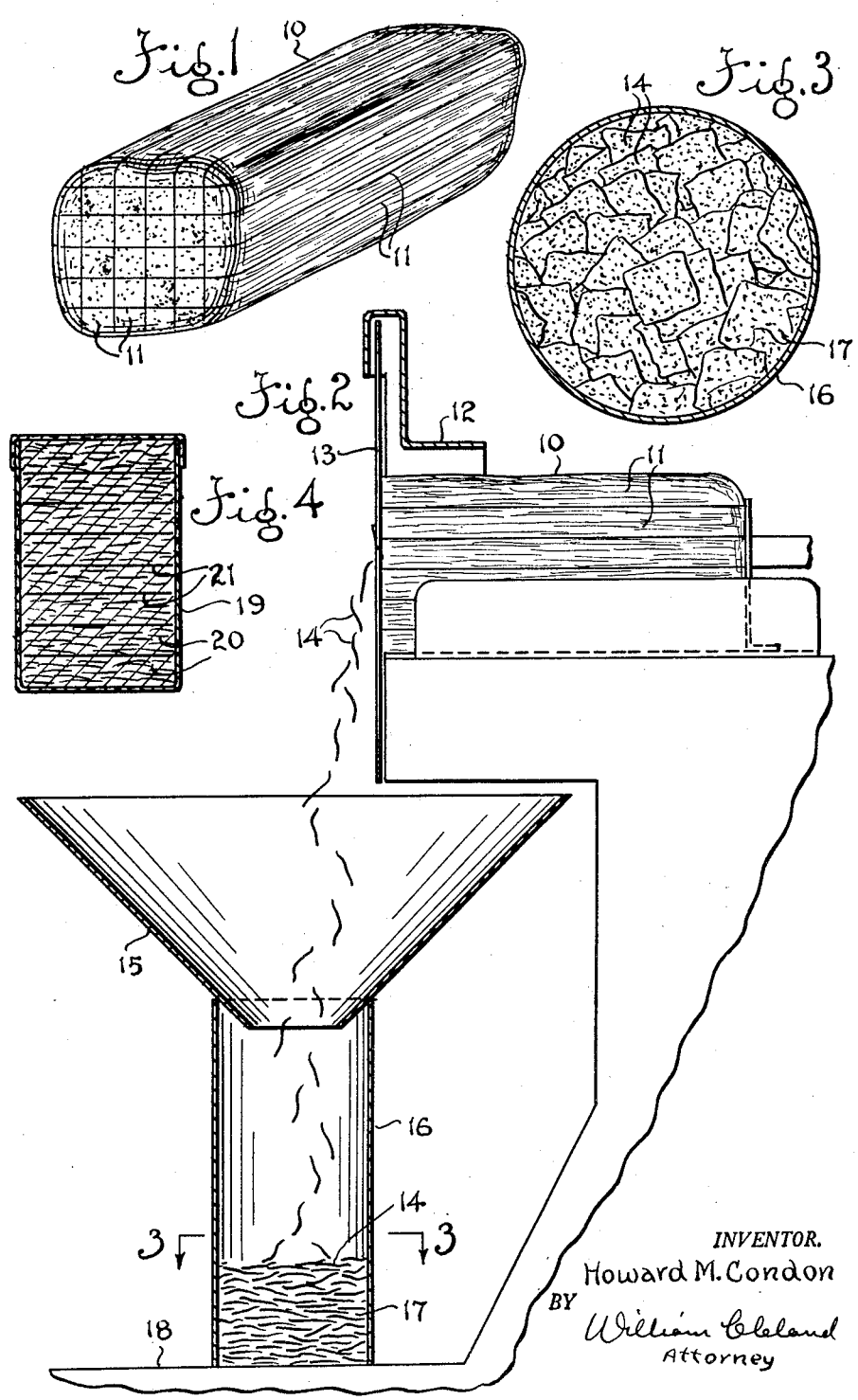
Oct. 24, 1950 — H. M. CONDON — 2,527,493
MEAT PRODUCT AND METHOD OF TREATING MEAT
Filed March 27, 1947
INVENTOR.
Howard M. Condon
BY William Cleland
Attorney

MEAT PRODUCT AND METHOD OF TREATING MEAT

Howard M. Condon, Akron, Ohio, assignor to Grand Duchess Steaks, Inc., Akron, Ohio, a corporation of Ohio Application March 27, 1947, Serial No. 737,501

7 Claims. (Cl. 99—194)

This invention relates to a meat product and to a method of treating meat.

One object of the invention is to provide an improved meat product, particularly adaptable for sale in quick frozen state, in which substantially all of the original color and flavor of the meat is retained, and which has the additional advantage of being easily digestible regardless of the fibrous structure of the original meat.

Another object of the invention is to provide a meat product of the character described adapted to be conveniently packaged in quick frozen condition and to be cooked in desired cake or patty form in a relatively few minutes.

Another object of the invention is to provide a simple and economical method for preparing the improved meat product described above.

Other objects of the invention will be manifest from the following brief description and the accompanying drawings.

Of the accompanying drawings:

Figure 1 is a perspective view of a chunk or block of meat cut into elongated strips in accordance with one of the method steps of the invention.

Figure 2 is a side elevation, partly broken away and in section, illustrating apparatus for carrying out a meat flaking operation of the invention.

Figure 3 is a cross-section, on an enlarged scale, taken substantially on the line 3—3 of Figure 2.

Figure 4 is a vertical cross-section through a package containing flaked meat produced in accordance with the invention.

Referring particularly to Figure 1, as an illustrative example, the method of the invention may be carried out by first providing a boneless chunk or block 10 of raw or uncooked meat and cutting the same, by use of any suitable cutting means (not shown), into elongated coextending strips 11, 11 of relatively small cross-section, as compared with the cross-section of the chunk. The original chunk 10, of course, might also be composed of several relatively smaller chunks, or it could be formed by arranging elongated cuts 11, 11 from any source, or from different kinds of meat, such as beef, pork, veal, etc. In any event, the block 10 of elongated strips 11, while maintained in the substantially compact or solid form of Figure 1, as by use of temporary binding means (not shown), may be placed in a known type of rapid freezing unit and frozen hard throughout. The temperature range suitable for this purpose may be from 20° to 40° below 0° F. This freezing of the block 10, by the nature of the meat, will bind the elongated strips 11 together.

Referring now to Figure 2, the hard frozen block of meat 10 may be placed in a suitable slicing machine 12 having a rotary cutter 13 to cut, in rapid succession, paper thin slices of meat from the end of the block. Although in the frozen condition of the block the strips are cohesively held together by fusion of the natural moisture of meat, when said thin slices are thus removed, such cohesion is insufficient to prevent separation of the corresponding slice portions from the respective strips 11, and each of the thin slices, therefore, in falling away from the cutter 13 separates into a plurality of chip-like pieces or flakes 14, 14. The chips or flakes 14 may be allowed, for instance, to fall through a funnel 15 into an open ended, stainless steel cylinder 16, of desired size and cross-section, to collect a correspondingly shaped mass 17 of flakes 14 on a surface 18. The mass 17 may be packaged or otherwise maintained in loose form or it may be compressed into compact form in any desired shape or size. As a typical illustration, a compact mass of flakes 14 may be packaged in a suitable closed container 19, either in one solid mass, or in a series of cakes or patties 20 separated as by means of wax paper spacers 21. As best shown in Figures 3 and 4, the flakes of the patties in particular are arranged haphazardly in generally superposed and substantially overlapping relation. In any case, the packaged product may be placed in quick freezing equipment and thereafter retained in frozen condition until ready for use. If the packaged product is retained in one solid piece, as described, parts thereof may be separated or cut from the whole mass and formed into any desired size or shape, as for example, into a cake or patty to be fried, broiled, or otherwise prepared for eating. Should the product be packaged in patty form, as shown in Figure 4, it is only necessary to remove the patties as desired for use.

During the flaking operations, as shown in Figure 2, suet or fat may be added if desired. Flavoring materials are easily added in the same way.

When the strips 11 are arranged in the block 10 with the fibre structure thereof extending longitudinally of the strips, the resulting product comprises a multiplicity of flakes 14, 14, of non-fibrous nature, and therefore easily digestible when cooked, regardless of how tough the original meat cuts may have been. It has been found that by the use of the herein described process the original coloring and flavoring of the meat is preserved in the frozen packaged product until ready for use. It is contemplated, however, that the above described flaking process may be similarly carried out with the use of cooked or partially cooked meat as a basis in the block 10 of strips 11.

Modifications of the invention may be resorted to without departing from the spirit thereof or the scope of the appended claims.

What is claimed is:

1. A method of treating meat, which comprises the steps of providing a block composed of a plurality of non-coherently, longitudinally coextending strips of meat of relatively small transverse cross-section as compared with the transverse cross-section of the block, freezing the block to substantially hardened state throughout, slicing relatively thin slices from the hardened block in planes transversely of said strips, the removed slices thereby separating into relatively small flakes from said coextending strips, and forming the flakes into a compact integrated mass thereof of desired size and shape, the average size of said flakes being such as would require a substantial number of the same to cover the broad lateral surface area of a said mass in flattened patty form for cooking purposes.

2. A method of treating meat, which comprises the steps of providing a block of meat, cutting said block in series of planes to provide a plurality of non-coherently, longitudinally coextending strips maintained in the block, freezing said cut block to hardened state, removing relatively thin slices from the frozen block transversely of said strips, each of the slices thereby separating into a substantial number of relatively small flakes from the respective pieces of the block, and compressing said flakes into a compact integrated mass of desired size and flattened patty shape for cooking purposes, the average size of said flakes being a relatively small fraction of the broad lateral area of the patty-shaped mass.

3. A method of treating meat, which comprises the steps of providing a block composed of non-coherently, longitudinally coextending strips of meat in hard frozen state throughout, the average transverse cross-section of said strips being a relatively small fraction of the total cross-section of the block transversely thereof, cutting relatively thin slices from the frozen block in planes transversely of said strips, the removed slices thereby separating into relatively small flakes from the respective strips of the block, and compressing a multiplicity of said flakes into a compact integrated mass of desired size and flattened patty shape for cooking purposes, said strips of meat in said block having the fibres thereof extending generally longitudinally thereof, and the resulting flakes thereby being substantially non-fibrous, the average size of said flakes being a relatively small fraction of the broad lateral area of the patty-shaped mass.

4. A meat product comprising a compact integrated mass for cooking purposes, said mass being composed of a multiplicity of relatively thin substantially non-fibrous flakes of meat, said flakes in the mass being in generally superposed, substantially overlapping relation.

5. A meat product comprising a compact integrated mass of relatively thin, substantially non-fibrous flakes of meat, said mass being of a flattened patty shape and size for cooking purposes, said flakes in the mass being in generally superposed, substantially overlapping relation.

6. A meat product as set forth in claim 4, said mass being in hard-frozen condition.

7. A meat product as set forth in claim 5, said mass being in hard-frozen condition.

HOWARD M. CONDON.

REFERENCES CITED

The following references are of record in the file of this patent:

UNITED STATES PATENTS

| Number | Name | Date |
|---|---|---|
| 1,381,526 | Waters | June 14, 1921 |
| 2,052,221 | Dubil | Aug. 25, 1936 |
| 2,224,390 | Holly | Dec. 10, 1940 |
| 2,242,451 | Carpenter | May 20, 1941 |
| 2,255,796 | Linane et al. | Sept. 16, 1941 |
| 2,397,446 | Tansley | Mar. 26, 1946 |